Figure 2:
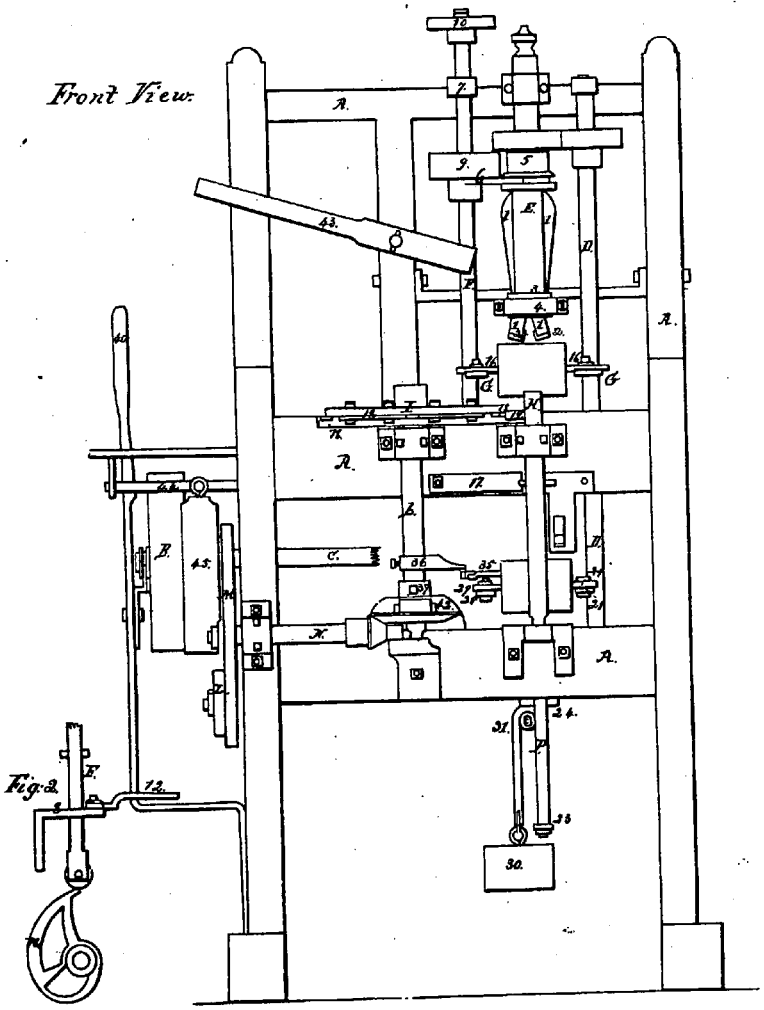

(12) United States Patent
Read et al.

(10) Patent No.: X8287
(45) Date of Patent: Jun. 27, 1834

(54) SCREW, WOOD

(76) Inventors: Rufus C.Read; Clement O. Read

X8287

R. C. & C. O. Read. {Sheet 1 / 6 Sheets.

Wood Screw Mach.

Patented Jun. 27, 1834.

Front View.

U. PETERS, PHOTO-LITHOGRAPHER, WASHINGTON, D. C.